(12) United States Patent
Ritamäki et al.

(10) Patent No.: US 8,794,531 B2
(45) Date of Patent: Aug. 5, 2014

(54) RADIO FREQUENCY IDENTIFICATION TAG

(75) Inventors: Matti Ritamäki, Nokia (FI); Marko Hanhikorpi, Pirkkala (FI); Heikki Ahokas, Tampere (FI); Lari Kytölä, Laukaa (FI)

(73) Assignee: Confidex Oy, Tampere (FI)

( * ) Notice: Subject to any disclaimer, the term of this patent is extended or adjusted under 35 U.S.C. 154(b) by 1176 days.

(21) Appl. No.: 12/309,224

(22) PCT Filed: Jul. 13, 2007

(86) PCT No.: PCT/FI2007/050430
§ 371 (c)(1),
(2), (4) Date: Dec. 3, 2009

(87) PCT Pub. No.: WO2008/006947
PCT Pub. Date: Jan. 17, 2008

(65) Prior Publication Data
US 2010/0065647 A1     Mar. 18, 2010

Related U.S. Application Data

(60) Provisional application No. 60/830,330, filed on Jul. 13, 2006, provisional application No. 60/898,402, filed on Jan. 31, 2007.

(51) Int. Cl.
*G06F 17/00*     (2006.01)
*G06K 19/00*     (2006.01)
*G06K 19/06*     (2006.01)
*G08B 13/14*     (2006.01)
*H01Q 1/38*      (2006.01)

(52) U.S. Cl.
USPC .... 235/492; 235/375; 235/487; 343/700 MS; 340/10.1; 340/572.7

(58) Field of Classification Search
USPC ................. 235/375, 487, 492; 343/700 MS; 340/10.1, 572.7
See application file for complete search history.

(56) References Cited

U.S. PATENT DOCUMENTS

| 6,144,301 A | * | 11/2000 | Frieden ...................... 340/572.8 |
| 2005/0092845 A1 | | 5/2005 | Forster |
| 2005/0248459 A1 | * | 11/2005 | Bonalle et al. ............. 340/572.8 |

(Continued)

FOREIGN PATENT DOCUMENTS

| CH | 688 391 A5 | 8/1997 |
| EP | 1 542 309 A | 6/2005 |

(Continued)

OTHER PUBLICATIONS

International Search Report dated Dec. 3, 2007, 3 pages.

(Continued)

*Primary Examiner* — Michael G Lee
*Assistant Examiner* — Laura Gudorf
(74) *Attorney, Agent, or Firm* — Brian J. Colandreo; Michael T. Abramson; Holland & Knight LLP

(57) ABSTRACT

The present invention relates to a radio frequency identification tag which is adapted to work at a frequency between 850 MHz and 950 MHz. The tag may comprise a planar inverted F antenna, a loop antenna, or a dual patch antenna.

10 Claims, 16 Drawing Sheets

(56) References Cited

U.S. PATENT DOCUMENTS

Figure 1:
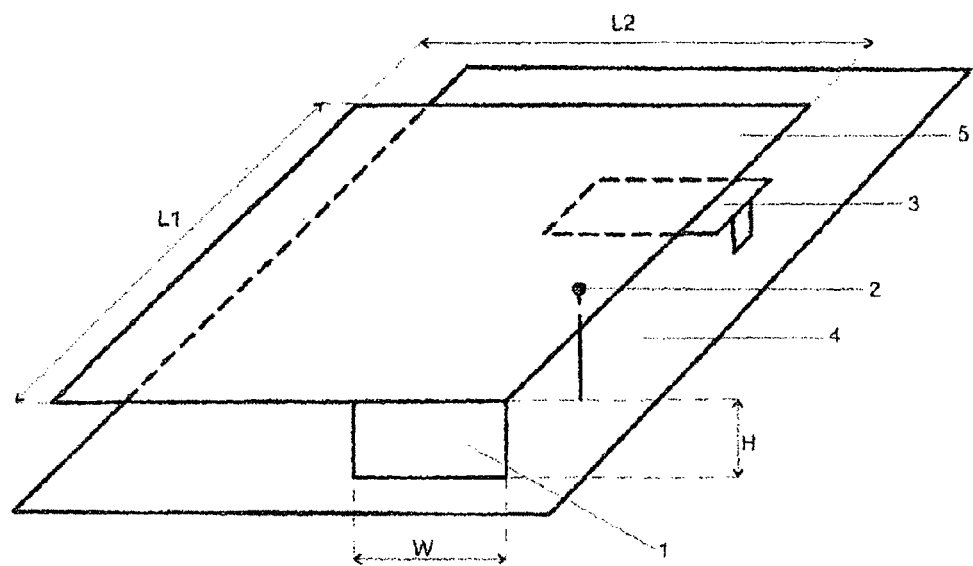

| | | | |
|---|---|---|---|
| 2006/0032926 A1* | 2/2006 | Baba et al. | 235/492 |
| 2006/0054710 A1* | 3/2006 | Forster et al. | 235/492 |
| 2006/0145927 A1* | 7/2006 | Choi et al. | 343/700 MS |
| 2007/0274626 A1* | 11/2007 | Sabeta | 385/24 |

FOREIGN PATENT DOCUMENTS

| | | |
|---|---|---|
| EP | 1 542 309 A1 | 6/2005 |
| EP | 1 626 364 A | 2/2006 |
| WO | WO 93/15418 A | 8/1993 |
| WO | WO 98/35243 A | 8/1998 |
| WO | 2007132053 A1 | 11/2007 |

OTHER PUBLICATIONS

International Preliminary Report on Patentability received in related international application No. PCT/FI2007/050430 issued on Jan. 13, 2009 (8 pgs.).

* cited by examiner

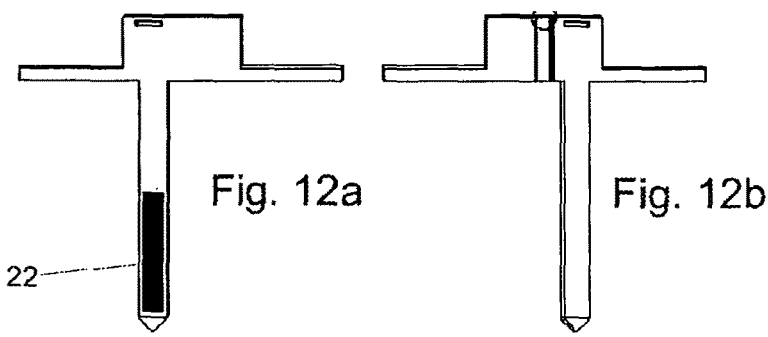
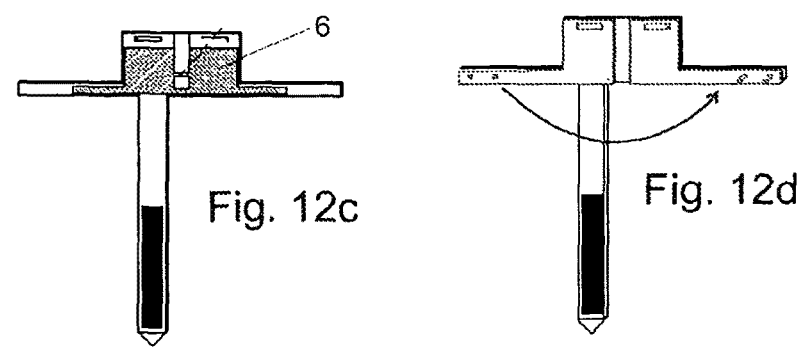
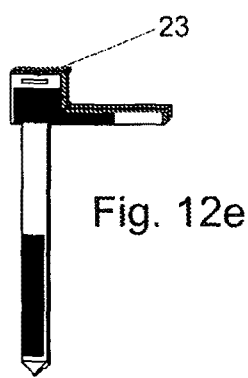

RADIO FREQUENCY IDENTIFICATION TAG

RELATED APPLICATIONS

The subject application is a U.S. National Stage Application of International Application No. PCT/FI2007/050430, filed on Jul. 13, 2007, which claims the priority of U.S. Provisional Application No. 60/830,330, filed Jul. 13, 2006 and also claims the priority of U.S. Provisional Application No. 60/898,402, filed Jan. 31, 2007, the contents of which are herein incorporated by reference in their entirety.

The present invention relates to a radio frequency identification tag.

Dipole antennas are by their nature more wideband compared to many other antenna types so they are a very likely choice for RFID applications which require wide band functionality due to different dielectric loadings and due to the fact that same tags should be usable at frequencies from 850 to 950 MHz (different ITU regions, ITU=International Telecommunication Union). However, in applications where either reflecting (metal) or highly absorbing materials (water, moist materials) are present, dipoles require large standoff from material, and dipoles also need to be large (half a wavelength), so they are very impractical from their form factor.

Previously, mostly label-type RFID tags or impractical/expensive encapsulated rigid tags have been used to tag RTI's (=returnable transit items) and other metallic parts. Until now, there has not been a sufficiently low-cost but still multi-use RF and durable tag product which would also have a practical seal in the tag (i.e., a seal from which tampering/removal can be easily checked and which is resistant to harsh ambient conditions without being broken). Thus, the tagging of metallic parts, especially different types of trays, dollies, and other RTI's, has been a great challenge. The challenges relate mostly to the RF performance/visibility of the tag, its resistance to extremely harsh end use environments, the fixing of the tag to the RTI, the price of the tag, and to the fact that the tag can be easily removed from a tray and put onto a fake. This counterfeiting of RTI's is an especially difficult issue for pool owners, who very often have to service, replace and cope with the low quality counterfeited RTI's, as there is no way to prove their origin.

The main idea of this invention is to introduce a tag which solves the problem of creating a global wideband tag by using the same inlay structure. The present invention also solves the problem of manufacturing tags with a low cost/small size, but functioning very well with respect to the RF (the tag functions on metal and/or the tag is insensitive to the contents of the container to which it is attached).

In addition to the main idea, the present invention also deals with a question how to seal the tag, either mechanically or electrically, in order to prevent disengaging of the tag from its original position, and re-engaging it to another position. Tampering, or removal of the tag can be easily checked from the seal. Furthermore, the invention solves the problem of attaching encapsulated tags to objects without adding much cost.

In order to achieve the goals of the invention, novel structures and manufacturing methods are described in this application.

According to the invention, the global wideband tag can be produced by using a planar inverted F antenna (PIFA), a loop antenna, or a dual patch antenna. The antenna is adapted to work at ultra high frequencies between 850 MHz and 950 MHz. The tags according to the invention differ from each other in structure, but the inventive concept is the same, i.e. how to create such a tag which functions in different standard frequency ranges because, for example, European countries and North America apply different frequency ranges.

According to the first embodiment of the invention, the tag comprises a planar inverted F antenna. The tag comprises a dielectric core plate which has a face side and a back side. The core plate is preferably made of plastic material. An inlay having a dielectric substrate is wrapped around the dielectric core. Two electrically conductive plates are formed on the surface of the dielectric substrate, and they are located so that one of the plates is on the face side of the dielectric core plate, and the other is on the back side of the dielectric core plate. The electrically conductive plates are of different size, and they form a part of the planar inverted F antenna. The planar inverted F antenna further comprises at least one short circuit element and a feeding point at which an integrated circuit on a chip is attached.

One of the electrically conductive plates is used as a resonating antenna, and the other plate is used as a ground plate. It is possible to choose which is which by turning the resonating antenna side up. Thus, it is possible to determine the desired frequency during the manufacture of the tag, or this can be decided by a user. When the tag comprising the PIFA is turned upside down, the frequency range in which the antenna functions, is changed. Therefore, the tag is cost-effective to manufacture because the inlay is the same throughout the band from 850 MHz to 950 MHz.

The simplest form of the tag according to the first embodiment of the invention is a structure in which an inlay and possibly other layers attached to the inlay are wrapped around the dielectric core. The tag may be provided with adhesive so that it is possible to attach the tag to a desired surface. However, the dielectric core and the inlay may be arranged inside a plastic encapsulation so that the encapsulation protects the inlay.

The PIFA-type tag antenna actually benefits from metallic parts of RTI (returnable transit items) or any other metallic object as the metal surface is actually an extension to the ground plate. Therefore, instead of the metal surface decreasing the RF performance of the tag, it, in fact, enables the functionality. Generally, the PIFA structures provide by far the best performance for smallest size, when compared to dipoles and patches.

When the PIFA is constructed properly, due to its radiation pattern construction, it hardly couples electrically to adjacent tags at all (in contrast to, for example, dipoles). This feature is very important in many RTI applications (especially trays) as there are commonly many tags very close to each other.

The tag of invention can also be used as a stand-alone tag in the sense that the clip/seal can be bent around the tag. In this case, the main tag body and the clip do not have any metal object between them, i.e. it is possible to attach the present tag also to other surfaces besides the metallic surfaces, for example to wooden surfaces.

The invention solves the problem of manufacturing a reliable (on metal) or content insensitive tag at low cost and with a small form factor. For example, with the tag of this invention, one can get over 7 m read range in ETSI (=European Telecommunication Standard Institute) band with a tag size of for example 44×32 mm with a core plate thickness of only 6 mm.

According to the second embodiment of the invention, the tag comprises a loop antenna. The loop antenna comprises two electrically conductive coupling plates, and an integrated circuit on a chip is electrically connected to the coupling plates. The coupling plates may be of different size, or of the same size. In use, the inlay is bent from its ends so that a loop is formed. In practice, the inlay is inserted inside a capsule in a narrow slot so that the loop is formed. After that, a lid is attached to the capsule e.g. by using ultrasonic welding.

The loop antenna functions as a dipole antenna without a ground plane. Thus, the surface to which the tag is attached must be provided with the ground plane, or the tag has to be provided with a separate ground plane. The separate ground plane may be formed so that a strip containing electrically conductive material is attached to the underside of the capsule. The strip may be, for example, a copper or aluminium laminate, which is adhesively (e.g. by using pressure sensitive adhesive) attached to the underside of the capsule. The strip closes the loop electrically.

According to the third embodiment of the invention, the tag comprises a dual patch antenna. The tag comprises a dielectric substrate. There are two electrically conductive antenna patches, and an impedance matching loop on the surface of the substrate. An integrated circuit on a chip is attached to the impedance matching loop. The impedance matching loop and the chip are preferably between the two patches. The dielectric substrate is preferably a rigid substrate.

The size of the patch antenna can be reduced by using a ceramic substrate which has a high dielectric constant and low losses. For example, suitable materials for this purpose are RO 3010 available from Rogers Corporation (dielectric constant 10.2) or AD 1000 available from Arlon Microwave Materials (dielectric constant 10.2).

In connection with the first embodiment of the invention, it is possible to provide the encapsulated tag with a clip. The clip may act as a mechanical seal which is broken when one tries to open it. The clip may also act as an electrical seal. In that case the clip contains some parts of the inlay. If anyone tries to remove the tag from its original position, the inlay will break either mechanically or electrically. There are various possibilities to create the electrical seal; for example, one of the following parts may be placed in the clip: the integrated circuit on the chip, the antenna, or the ground plate. When the seal is disconnected, the electrical contact between the different elements break and the tag does not function any longer. The clip may be manufactured at the same time when the body of the tag is injection moulded. In practice, it is beneficial to form the clip as will be explained later in this application. In some cases the mechanical seal may also be applied to the second embodiment of the invention.

The invention also relates to the efficient manufacture of the tags. In principle, all the tags according to the first, second and third embodiments may be manufactured so that the functional elements of transponders (e.g. an antenna) are formed on the surface of a flexible inlay web, such as a PET (polyethylene terephtalate or polyester) web, or they are attached to the surface of the flexible inlay web (e.g. an integrated circuit on a chip). However, in the third embodiment of the invention it may be beneficial to use rigid substrates, such as PTFE (polytetrafluoroethylene) based, ceramic filled substrates, because the high dielectric constant and low losses of the substrate are important. The electrically conductive elements on the surface of the rigid substrate are usually manufactured by etching. Another way to manufacture the tag according to the third embodiment of the invention is that a flexible inlay web is used, a single inlay is cut off from the web, and a layer of plastic is attached to at least the backside of the inlay. The plastic layer may be attached to the inlay so that a plastic plate is attached to the inlay by using an adhesive, or the plastic layer is formed from molten plastic e.g. by using the injection moulding method.

In all embodiments, the electrically conductive elements, e.g. antennas, short circuit elements, and ground plates, can be manufactured, for example, by printing, etching, vaporizing, sputtering or by some other additive technique on the surface of the web. It is also possible that the electrically conductive elements are die-cut from a metallic foil, and attached to the inlay web. The electrically conductive elements comprise an electrically conductive material, such as copper, aluminium, or silver.

With respect to all embodiments, the integrated circuit on the chip is attached to the antenna either capacitively, inductively, or by an ohmic contact. In this application, all these connections are referred to as electrical connections. The chip can be a silicon chip or a polymer chip. There are several possibilities to attach the chip to the antenna, for example by using solder paste, isotropically conductive adhesive, or anisotropically conductive adhesive. The adhesive can be a film or a fluid adhesive which will be dried and/or cured. The chip may be placed on a separate strap, and the strap is attached to the antenna by using the above-mentioned materials. In practice, a bare chip is usually attached to the antenna so that it forms the ohmic contact, but if the chip is placed on the separate strap, all the above-mentioned contacts are possible as well.

The final 3D structure of the PIFA may be created in the following way:

1. An inlay is wrapped around a core plate, and after that the core plate and the inlay may be encapsulated in the injection moulding process.

The core plates are stacked into an input cassette of an inlay wrapping line. Another possibility is that core plates enter on a conveyor directly from the output of an injection lamination machine. The inlays are applied by means of a label applicator (and by a printer if variable data printing is needed) onto the plastic cores. The plastic cores with inlays applied are moved/turned automatically so that the inlays are wrapped into the plastic cores. Similar technology is used as in labelling lines. The ready cores are transferred with a conveyor into boxes, or if encapsulated tags are manufactured, the core plates with inlay wrapped around are placed automatically into an injection mould and plastic is moulded around them.

2. An injection moulded part is formed, an inlay is attached to the planar injection moulded part, and another injection moulded layer is formed on the inlay. Finally, the formed structure is bent to form the 3D structure.

The final 3D structure of the PIFA may be created in a later step when the tag is attached to the final metallic object, and therefore the RFID tag and its encapsulation, most often formed by injection moulding, can be made as a simple planar structure. This process can always be automated. The manufacturing process of PIFA based encapsulated tags consists of the following steps: tag antenna manufacturing, IC assembly and converting (lamination) in reel to reel format, encapsulation (injection moulding) by picking inlays automatically from reel and placing them by means of a robot, as an insert to a mould.

Further, the final structure of the PIFA product needs to be three dimensional, but with the innovation that the ground plate (or antenna plate) is on the mechanical seal or clip part, it is possible to manufacture the tag in two dimensions, thereby involving a minimum number of manufacturing processes and applying full automation for this. The 3D structure is created when the tag is mounted on an object in the field. This step will always require some manual work in any case, so no additional costs will be induced. In other words, the tag can be manufactured as a planar structure and just before mounting it is bent to form the 3D structure.

In both methods, the expensive inlay part of the tag is made in a reel to reel process, and the converting of the planar inlay into single 3D products is made by an automatic system.

Figure 2:
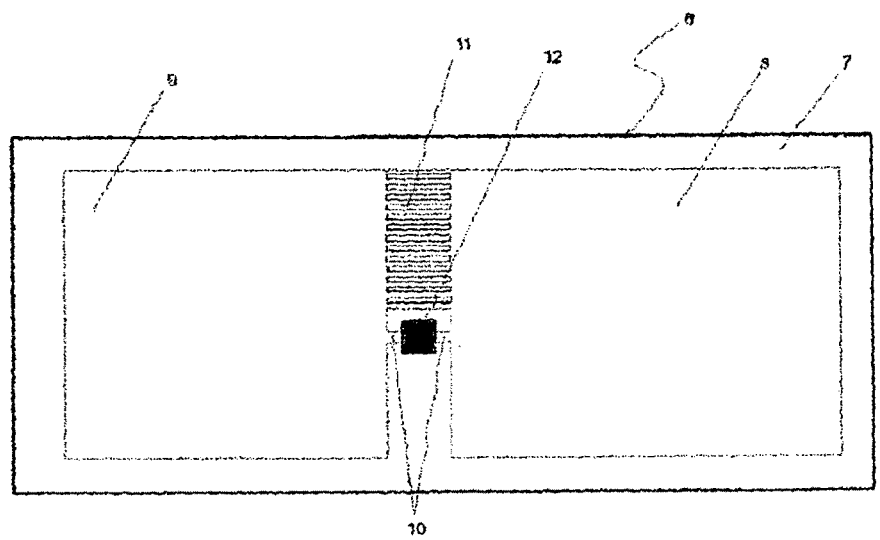
Figure 3:
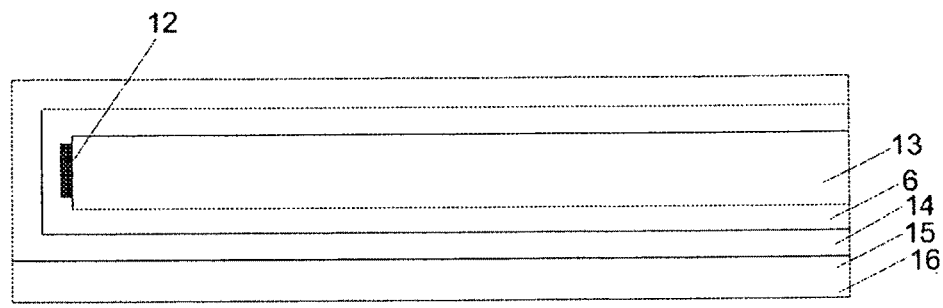
Figure 4A:
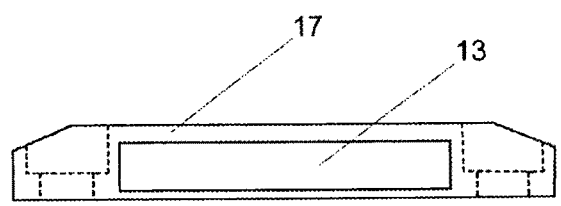
Figure 4B:
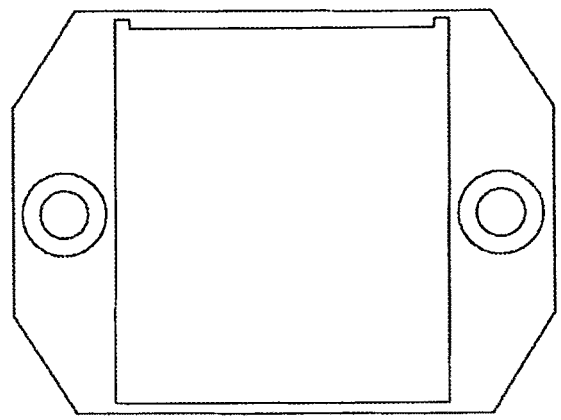
Figure 4C:
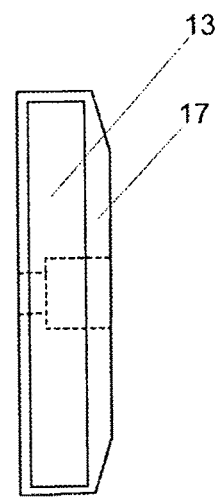
Figure 5:
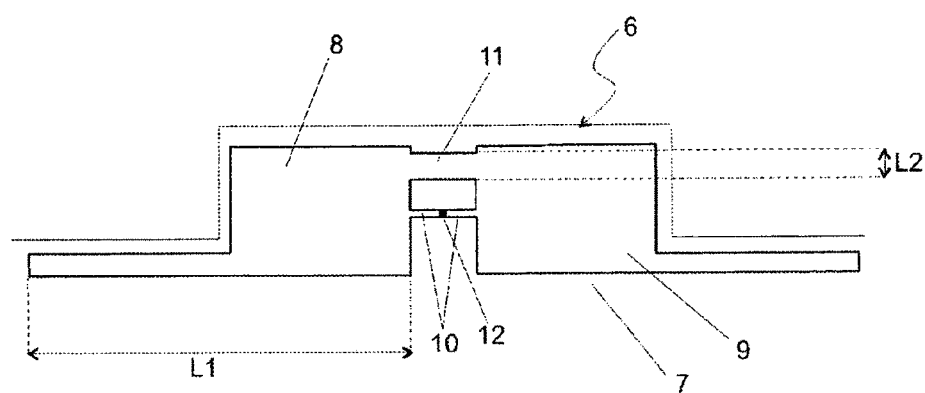
Figure 6:
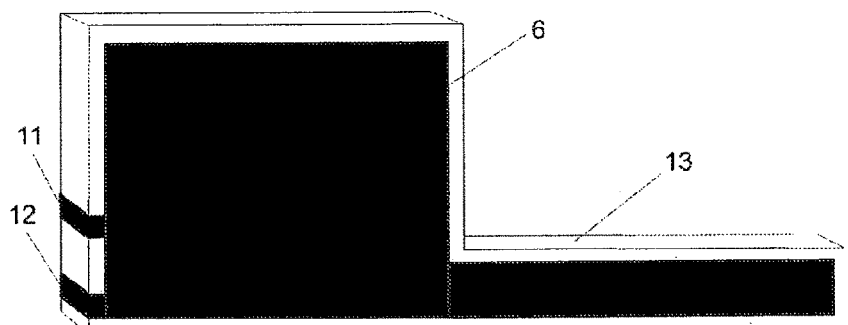
Figure 7A:
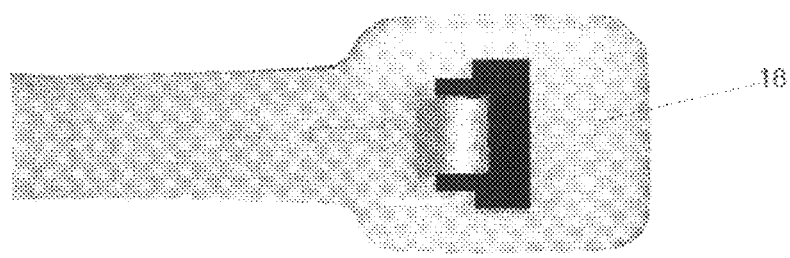
Figure 7B:
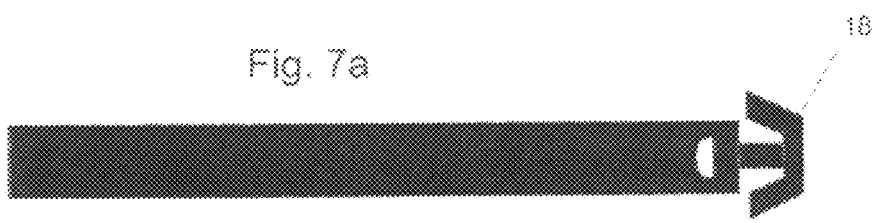
Figure 7C:
Figure 7D:
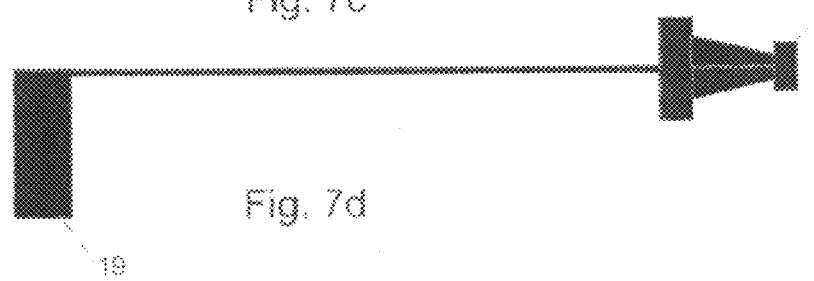
Figures 8A, 8B:
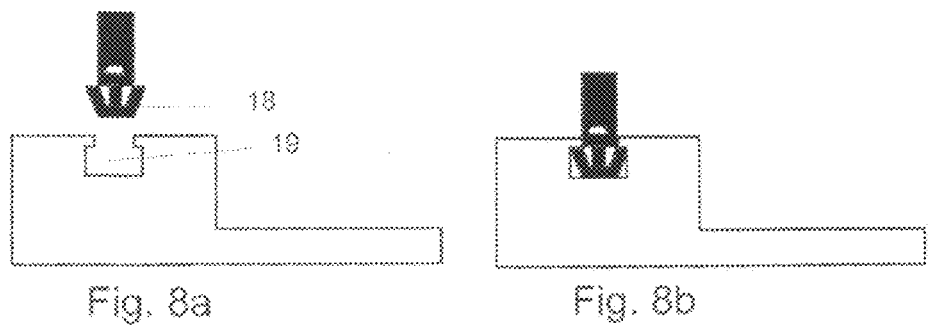
Figure 9A:
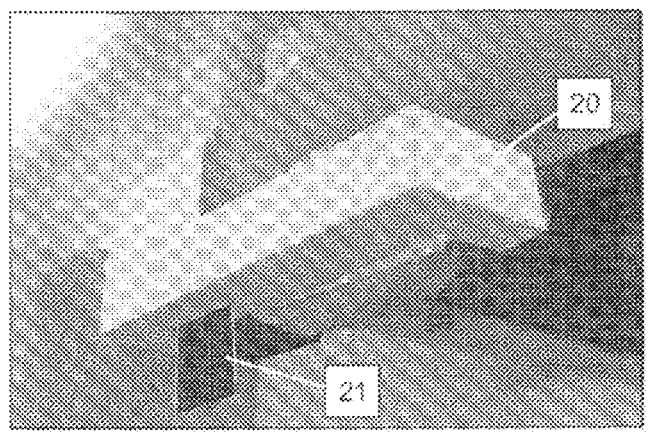
Figure 9B:
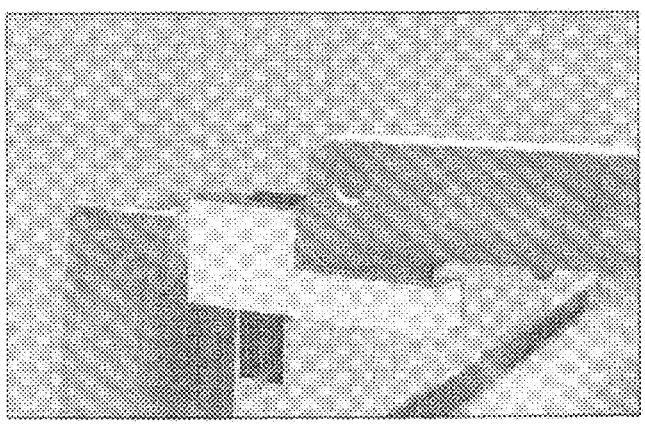
Figure 9C:
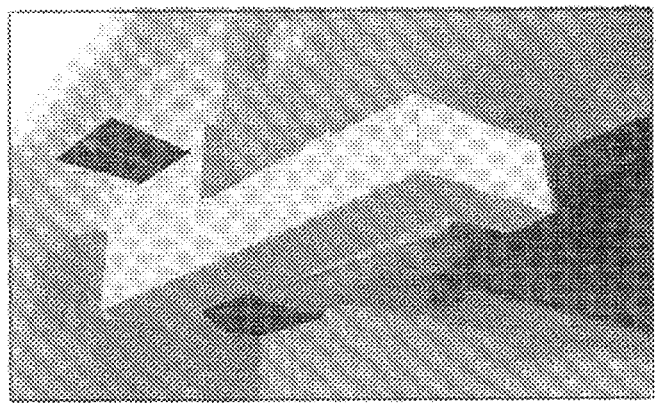
Figure 9D:
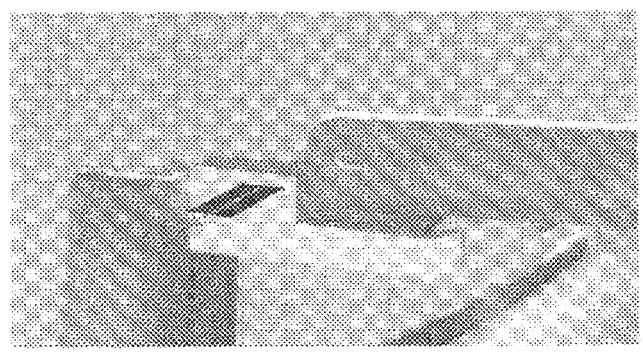
Figure 9E:
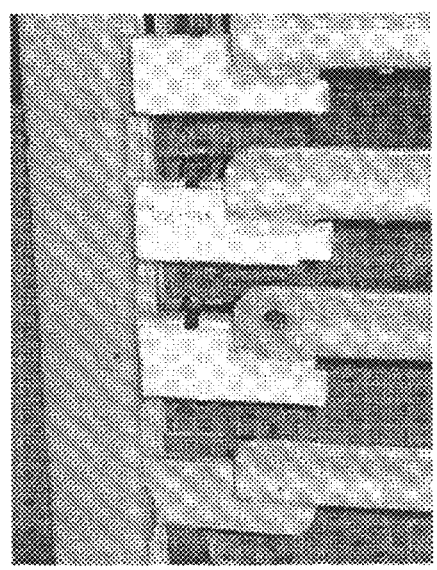
Figure 10:
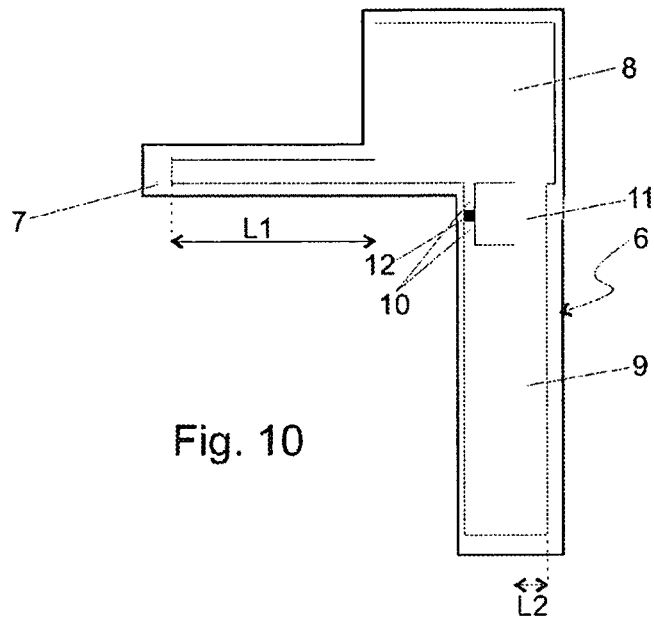
Figure 11A:
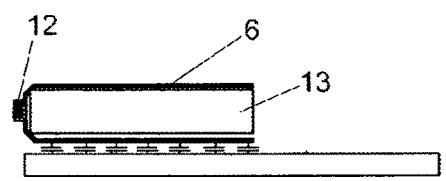
Figure 11B:
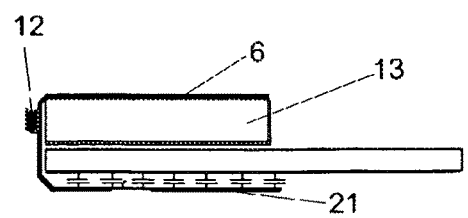
Figure 13:
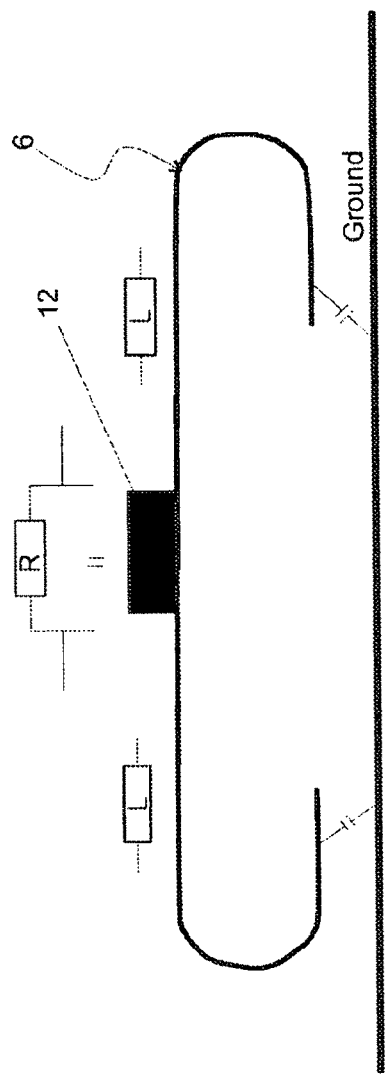
Figure 14A:
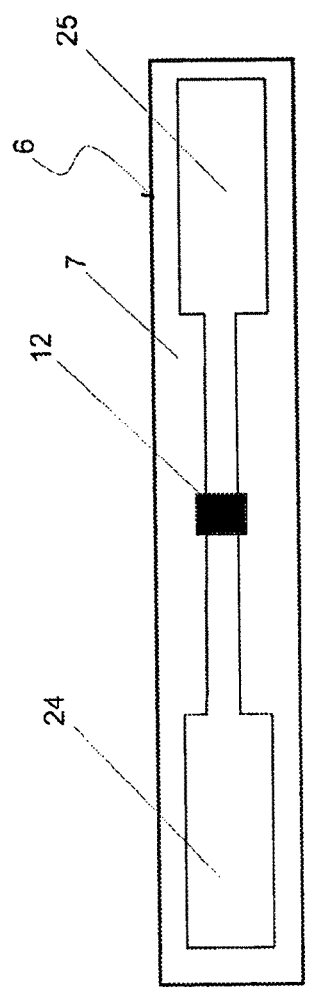
Figure 14B:
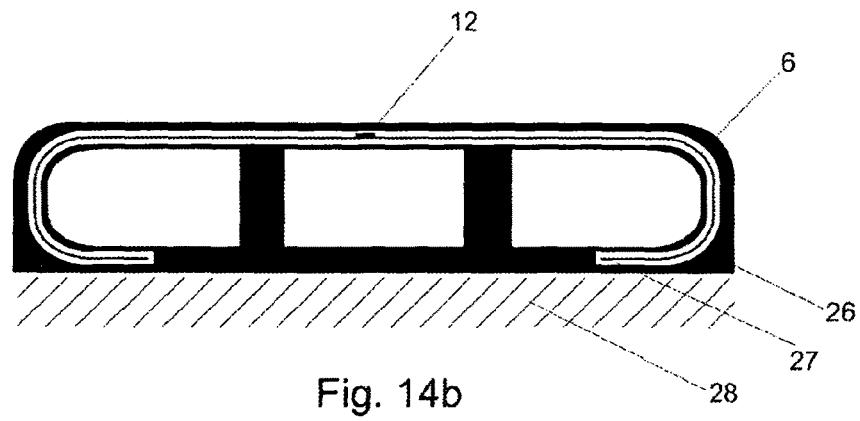
Figure 14C:
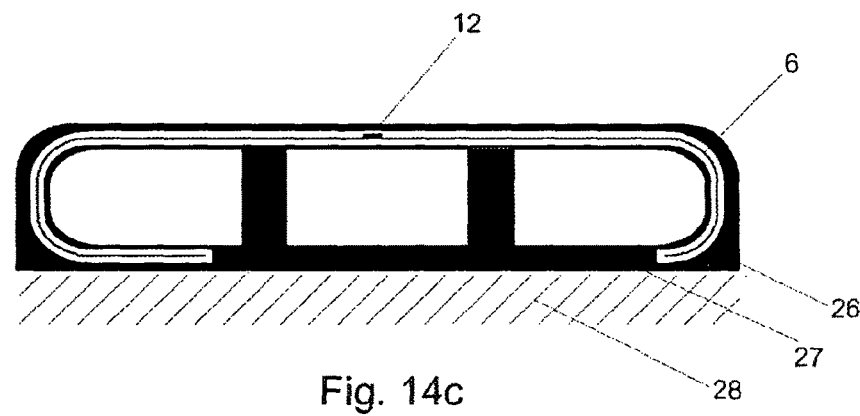
Figure 15:
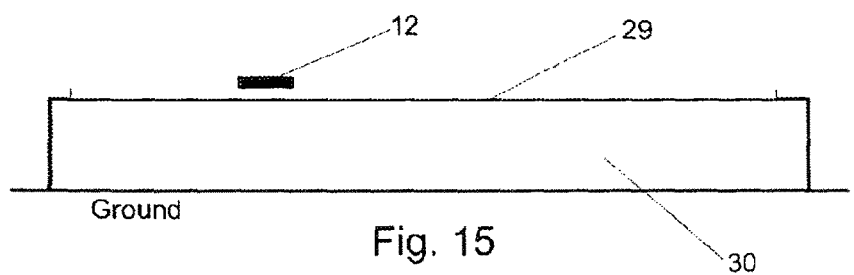
Figure 16:
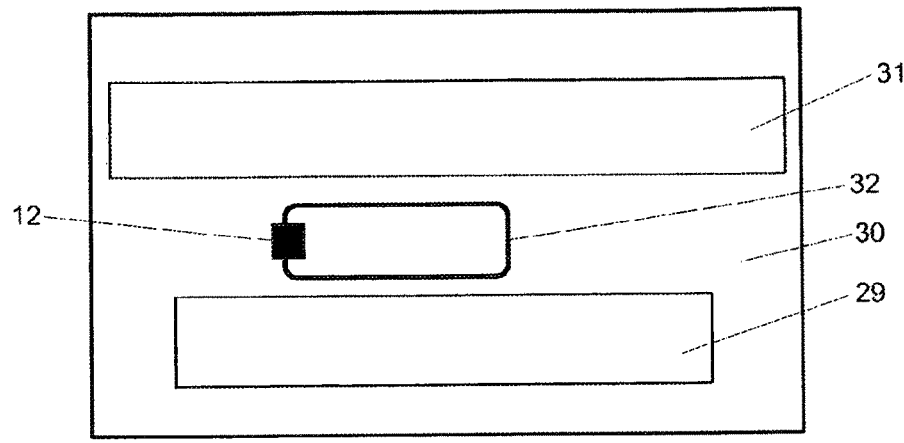
Figure 17:
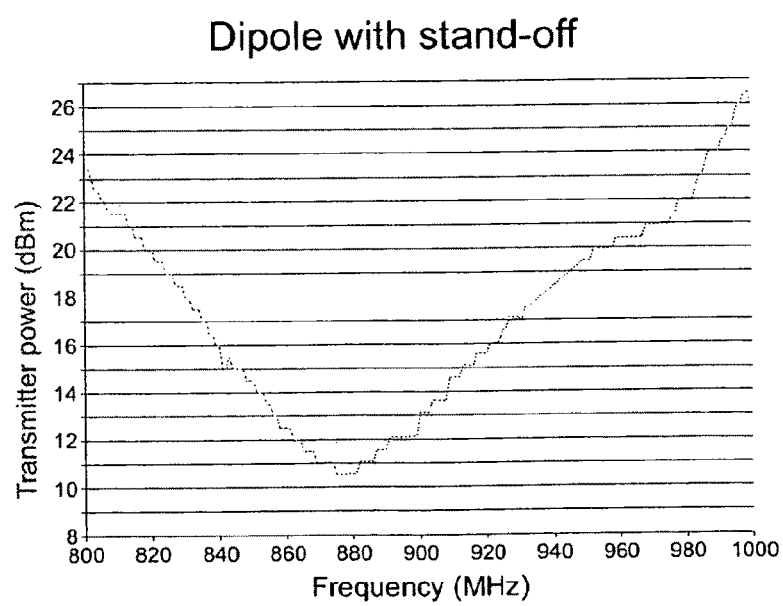
Figure 20:
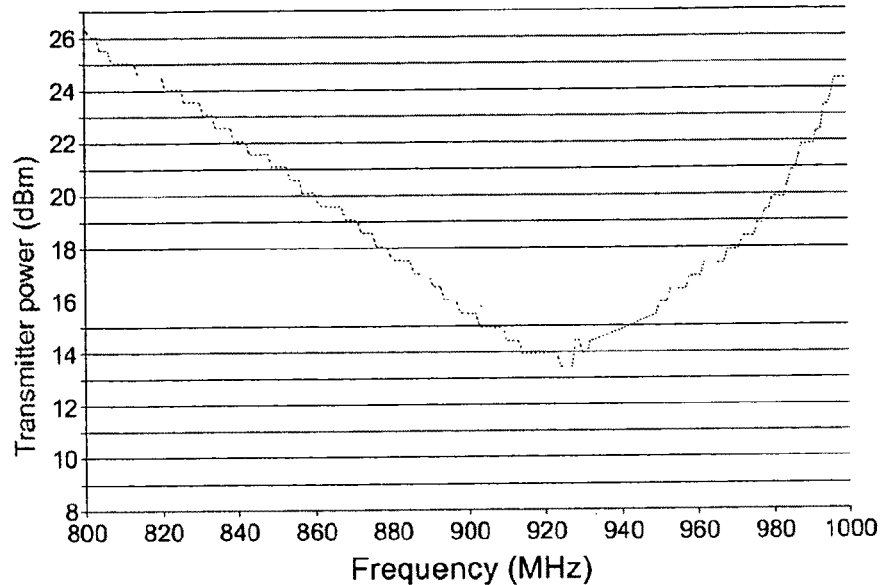
Figure 21:
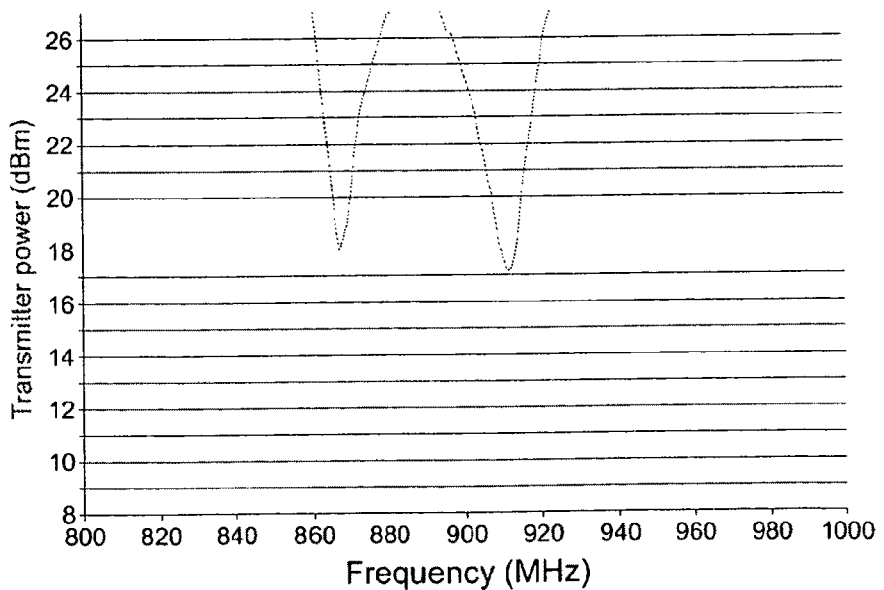
Figure 22:
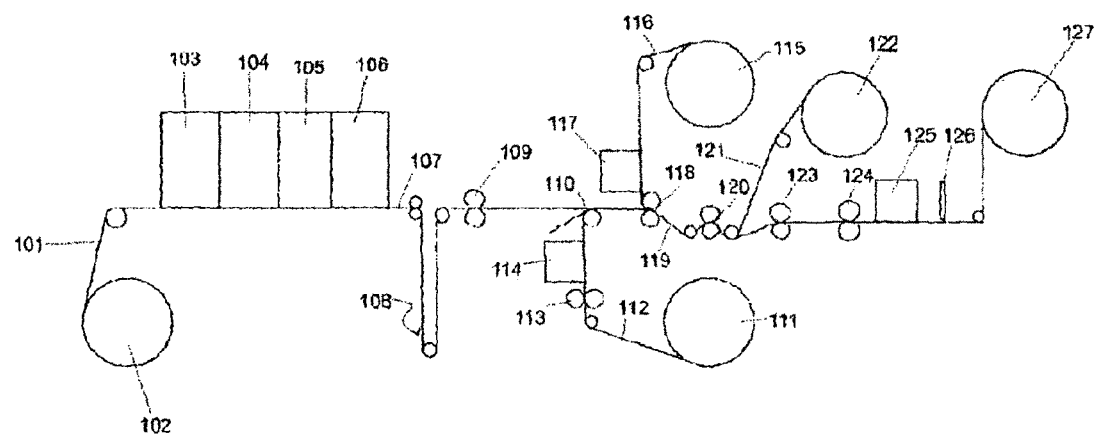
Figure 23:
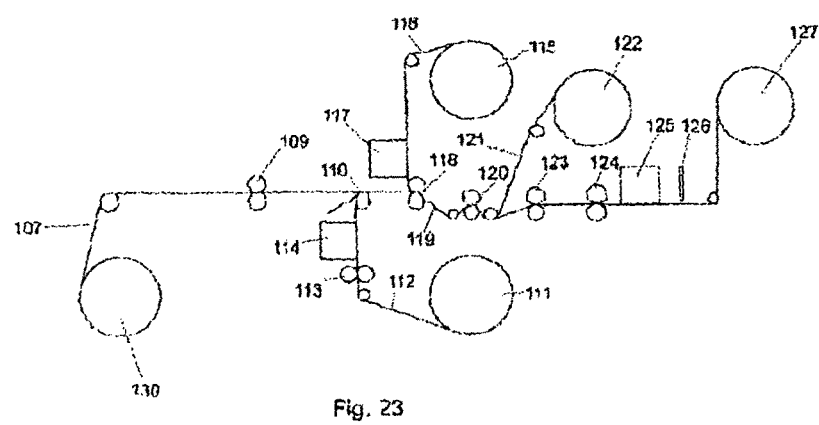

In the following, the invention will be described by referring to drawings in which FIG. 1 shows a perspective view of a planar inverted F antenna, FIG. 2 shows a view of an inlay comprising a planar inverted F antenna, FIG. 3 shows a cross-sectional view of one tag of the invention, FIGS. 4a to 4c show cross-sectional views of one tag of the invention, FIG. 5 shows a view of an inlay comprising a planar inverted F antenna, FIG. 6 shows a perspective view of a tag of the invention, FIGS. 7a to 7d show some clip constructions, FIGS. 8a and 8b show one example of the clip construction, FIGS. 9a to 9e show how a tag with a clip is attached to a flower tray, FIG. 10 shows one possible inlay with a seal, FIGS. 11a and 11b show a tag attached to a surface, FIGS. 12a to 12e show steps of manufacturing one tag according to the invention, FIG. 13 shows a cross-sectional view of a tag provided with a loop antenna, and an equivalent circuit, FIG. 14a shows an inlay to be used in a loop antenna construction, FIG. 14b shows a cross-sectional view of a tag comprising a loop-shaped inlay, FIG. 14c shows a cross-sectional view of a tag comprising a loop-shaped inlay, FIG. 15 shows a cross-sectional view of an inlay comprising a dual patch antenna, FIG. 16 shows a view of the dual patch antenna of FIG. 15 from above, FIGS. 17 to 21 show measurement results of antennas, and FIGS. 22 and 23 show possible manufacturing lines for inlays.

FIG. 1 shows a schematic perspective view of a planar inverted F antenna (PIFA). The antenna comprises a short circuit plate 1, a feeding point 2, a capacitor 3, a ground plane 4, and a planar element 5. The planar element 5 has a length L1 and a width L2. The resonant frequency of the antenna can be approximated by using formula L1+L2=lambda/4, wherein lambda is the wavelength.

The short circuit plate 1 has a width W and a height H. When the ratio W/L1=1, then L1+H=lambda/4. When W=0, then L1+L2+H=lambda/4.

Changes in the width of the planar element can also have an effect on the resonant frequency. The width of the short circuit plate of the PIFA plays a very important role in governing its resonant frequency. The resonant frequency decreases with a decrease in the width W of the short circuit plate 1.

The resonant frequency and the bandwidth characteristics of the antenna can be easily analyzed by determining the site of the feed point at which the minimum reflection coefficient is to be obtained.

The impedance bandwidth of PIFA is inversely proportional to the quality factor Q that is defined for a resonator:

$Q$=Energy Stored/Power Lost

Substrates with a high dielectric constant (Er) tend to store energy more than to radiate it. This is equivalent by modelling the PIFA as a lossy capacitor with high Er, thus leading to a high Q value and obviously reducing the bandwidth. Similarly, when the substrate thickness is increased, the inverse proportionality of thickness to the capacitance decreases the energy stored in the PIFA and the Q factor.

In summary, the increase in height and the decrease of Er can be used to increase the bandwidth of the PIFA.

FIG. 2 shows a plane view of an inlay 6. The inlay 6 comprises a substrate 7, planar elements 8 and 9, feed points 10, short circuit elements 11, and an integrated circuit on a chip 12. One of the two planar elements 8 and 9 can be used as a resonating planar element, and the other planar element is then used as a ground plane.

FIG. 2 shows, in practices, based on above PIFA theory and an illustration of the PIFA principle, how the planar inlay is constructed before it is wrapped around a plastic core (illustrated in FIG. 3) which creates the actual dielectric for the antenna and also the 3D structure. FIG. 2 also shows how two different resonance frequencies (ETSI and FCC, ETSI=European Telecommunication Standard Institute, FCC=Federal Communication Commission) are created by using either the left side or the right side of the inlay as the planar element and the other side as the ground plane. The planar element, i.e. the antenna, may be of copper, aluminium, silver or mixtures of those. The planar element may be etched, punched or printed, for example flexo or silk printed. In order to achieve the desired frequency, the short circuit elements may be cut in a desired manner. In addition to multiple short circuit elements, there may be a single short circuit element.

Parameters which have an effect on the tuning of the antenna include
- the size of the elements, i.e. the ratio L1/L2,
- the width of the short circuit element between elements L1 and L2 (strip of elements or one solid element), and
- the position of the feed point. However, the position of the feed point has less effect on the tuning than the two above-mentioned factors (strap or direct flip chip can be used).

As mentioned in the PIFA theory, when the left and right sides are of different sizes and the size of planar element defines the resonance frequency for the tag, two frequency bands are possible. For example, the inlay illustrated in FIG. 2 may be designed so that by putting it in such a way that the 868 MHz side is upwards, it works in the 868 MHz band, and by putting it the 915 MHz side upwards it works in 902 to 928 MHz band as well.

FIG. 3 shows a cross-sectional view of one tag of the invention. The inlay 6 is wrapped around a core plate 13 so that one of the planar elements (8 or 9) is on the upper surface of the core plate 13, and the other planar element (8 or 9) is under the core plate 13. The integrated circuit on the chip 12 is situated on the vertical side of the core plate 13 preferably so that the chip 12 lies against the core plate 13. The short circuit elements 11 are naturally also located on the same side as the chip 12. The inlay 6 may be attached to the core plate 13 by using an adhesive, preferably a pressure sensitive adhesive. A label material 14 covers the inlay 6, and the label material may be provided with letters and/or images. The label material 14 may be attached to the inlay 6 by using an adhesive, preferably a pressure sensitive adhesive. Under the inlay 6 there is an adhesive layer 15, preferably made of a pressure sensitive adhesive, which is for attaching the tag to the intended surface. A release sheet 16 protects the adhesive layer 15 until it is removed and the tag is attached to the intended surface. This kind of tag is a very cost-effective tag based on the PIFA theory.

FIGS. 4a to 4c show views of one tag of the invention. An inlay (not shown) is wrapped around a core plate 13 in the same way as shown in FIG. 3 (however, it may be that in this case there is no other layer around the core plate besides the inlay). The core plate 13 may be made of ABS (acrylonitrile/ butadiene/styrene copolymer). The core plate 13 provided with the inlay 6 is placed in an injection mould, and plastic material is injected around the core plate 13 and the inlay 6. Thus, an encapsulation 17 is formed. The encapsulation 17 may be made of two different plastic materials, such as ABS and a thermoplastic elastomer. ABS is a sufficiently hard material, thus protecting the inlay 6 from impacts. The thermoplastic elastomer is a resilient material, and it attenuates the possible impacts. The layers are preferably moulded so that the ABS layer is close to the inlay 6, and the thermoplastic elastomer covers the ABS layer, i.e. the thermoplastic elastomer layer is the outer layer of the tag.

FIG. 5 shows an inlay 6 according to the invention. The inlay 6 is useful in a flower tray application. The resonance frequency of the antenna increases when the dimension L1 becomes shorter, and decreases when the dimension L2 becomes narrower. FIG. 6 shows the inlay 6 of FIG. 5 when it is wrapped around the core plate 13.

FIGS. 7a to 7d show possible clip designs. The clip is integrated in the tag in such a manner that it forms either a mechanical seal or an electrical seal, or both. The mechanical seal is built in such a way that it acts as a flexible mounting clip and breaks when somebody tries to open it. Since the clip is integrated in the main tag body (injection moulded at the same time with the tag body), if the clip is mechanically broken, the tag cannot be used any longer either.

As evident, the locking head 18 needs a counterpart 19 with which it is engaged so that the locking is formed.

The clip can be constructed in many ways: one example is a plastic lock strap. When the locking mechanism is embedded in the tag body, it is impossible to open the clip without breaking the locking mechanism.

Another example is a clip structure where, instead of a strap, the tag body itself contains the locking mechanism (see FIGS. 8a and 8b). The tag body is formed from two bendable parts which are connected/locked together. Once the tag has been mounted around a metal structure and the two pieces locked together, it cannot be opened again without breaking the internal locking mechanism. This kind of a tag structure can also be used for a stand-alone tag (a tag which is not clipped together with a metal part).

There are many known ways to build a mechanism for the clip system as is shown in FIGS. 7 and 8. Any of these and all the other known principles can be applied.

In addition to the clip structures shown in the figures, it is possible that one end of a metallic wire is inserted in an injection mold to be integrated in a tag, and the other end is used to fasten the tag to the desired item (the same principle as in FIGS. 9a to 9e). In the case somebody tries to remove the wire, the tag will be broken.

An electrical seal can also be integrated in the clip. The operating principle of the electrical seal is very simple. It is based on breaking either the ground plate, the IC connection or the ohmic connection between the planar antenna and the ground plate element when the seal is opened with force. As can be seen from the above PIFA theory, if there is no electrical connection between the planar antenna element and the ground plate, or if the IC is located in the clip mechanism and is broken if the clip is broken, or if the clip containing the ground plane is broken, the tag does not function electrically any longer. In a strap type structure where the IC is located in a separate structural part, this electrical seal functionality can be implemented especially well.

There are many ways of creating a breaking mechanism in the clip (and in the tag structure). For example, a perforation in the inlay and clip structure can be used, or the walls of the clip can be made thinner.

FIGS. 9a to 9e show how the tag of the invention comprising the tag body 20 is fastened to a flower tray with the clip 21. Further, FIG. 9e shows that it is possible to place the tags quite close to each other so that they do not start to interact, i.e. they do not interfere with each other.

FIG. 10 shows an example of an inlay 6 provided with a seal. The upper arm of the inlay 6 is intended to be mounted inside an encapsulated tag, and an integrated circuit on a chip 12 is located on a clip forming a seal. Thus, if anyone tries to remove the tag, the electric circuit will be damaged.

FIGS. 11a and 11b show cross-sectional views of the tags. In FIG. 11a, the ground plate is outside the clip (as for example in the flower tray tag). In FIG. 11b, the ground plate is inside the clip. The last-mentioned is an example of the electrical seal. The ground plate may be perforated.

FIGS. 12a to 12e show the manufacturing steps of the tag with the seal. First, a blank for a tag is moulded (for example, by the injection moulding method). A clip 22 belongs to the blank. After that, a substrate comprising an antenna and an integrated circuit on a chip are attached (e.g. adhesively) to the blank (see FIG. 12c), i.e. the inlay 6 is attached to the blank. In the next step, plastic is moulded over the substrate (see FIG. 12d). Small tabs and recesses are also formed at this stage. The ready tag is bent and the tabs and the recesses are snapped together. When the tag is put into use, the clip is inserted in a slit 23 (see FIG. 12e). The clip 22 and/or the slit 23 comprises teeth or the like which form counterparts so that it is possible to tighten the clip but it is not possible to loosen it.

FIGS. 13 and 14a show a loop antenna. The loop antenna is used to obtain a wide frequency bandwidth. A small loop antenna acts like magnetic dipole. The same antenna can be used in different frequency regions.

The impedance of the loop antenna has to be matched with the impedance of the integrated circuit (IC). The inductance of the loop antenna must resonate with the capacitance of the IC in order to get the maximum performance. The loop antenna will be very small if the loop is directly connected to the IC. A very small loop area will lead to the low performance. The size of the loop can be increased by adding capacitively coupled elements. The area of these plate capacitors will determine the size of the loop or the resonance frequency. If the transponder is not mounted on metal, it will act like the dipole antenna. The structure of the loop antenna with an equivalent circuit is shown in FIG. 13.

FIG. 14a shows the structure of the loop antenna when the inlay 6 is straight. The antenna is formed on a substrate 7, and it comprises coupling plates 24, 25. By changing the size of the coupling plate (for example, making asymmetric coupling plates) and by choosing the way in which the antenna is placed to the plastic cover (for example, the slot 27 shown in FIG. 14b may be asymmetric, as shown in FIG. 14c, or the inlay may be asymmetric, and it can be placed in the slot 27 whose form is the same as in FIG. 14b), the wide band functionality can be increased further.

FIGS. 14b and 14c show the cross-sectional view of a tag comprising an inlay 6, and an encapsulation 26. The tag is attached to a surface 28. The body forming the encapsulation 26 comprises a slot 27 in which the inlay 6 is inserted. After the insertion, the slot 27 is closed e.g. by attaching a lid by ultrasonic welding. The encapsulation 27 may be manufactured by the injection moulding process.

FIG. 15 shows a side view of a patch antenna, and FIG. 16 shows a top view of the same. The inlay comprises two antenna patches, a lower frequency patch 31 and a higher frequency patch 29 on a substrate 30, which may be a rigid substrate. The inlay also comprises an impedance matching loop 32 and an integrated circuit on a chip 12.

The patch antenna is a very narrow-band antenna. Increasing the substrate thickness will increase the bandwidth of the antenna. The dimensions of the tag antenna are usually limited. Operation in different frequency regions can be obtained with dual band operation.

The dual band patch can be made with two separate microstrip patch elements. Both antennas will couple their signals to the impedance matching loop between the elements.

FIGS. 17 to 21 show measurement results of different antenna concepts. A dipole antenna with a stand-off is used as a reference (see FIG. 17).

The performance of the tags was evaluated with an RFID reader which has an adjustable carrier frequency and power. A tag under test was placed at a fixed distance, and the minimum output power at which the tag replied, was measured. The tag was placed on an aluminum sheet.

A dipole with a stand-off had an optimum frequency of 880 MHz and −3 dB bandwidth was 55 MHz, which guarantees operation in both EU and US frequency bands.

Figure 18:
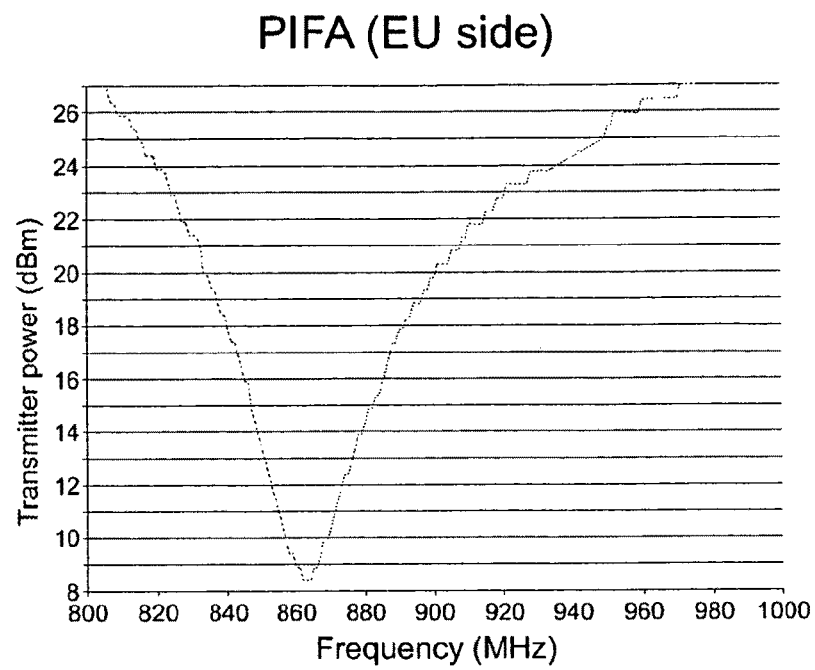
Figure 19:
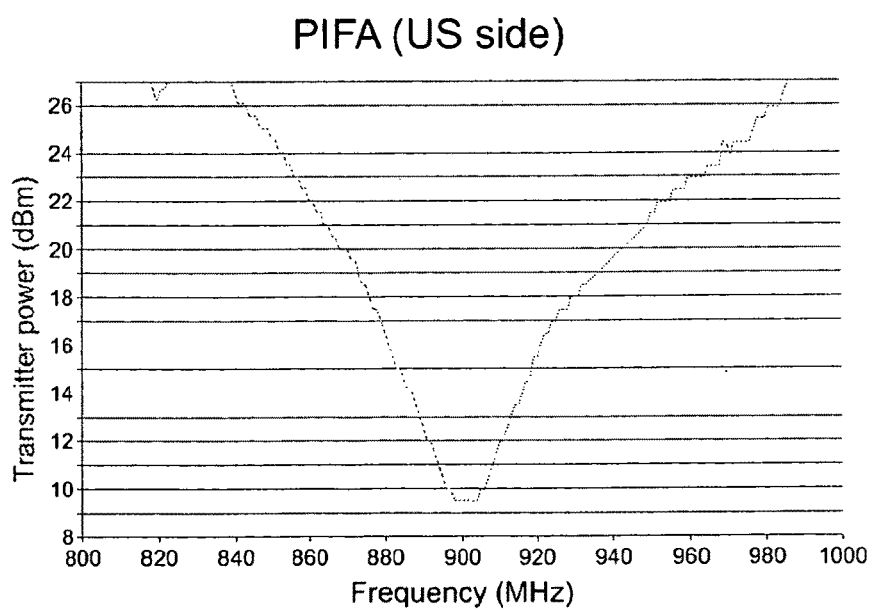

FIGS. 18 and 19 show measurement results of a two sided PIFA having two different frequency bands, depending on the side used. The EU band is shown in FIG. 18. The frequency is 860 MHz, but the bandwidth is only 15 MHz. The center frequency of the US band (FIG. 19) is 900 MHz and the bandwidth is 20 MHz.

Measurement results of a loop antenna are shown in FIG. 20. The center frequency of the tag is 920 MHz and the bandwidth is 60 MHz. The bandwidth characteristics are similar to those of the dipole antenna.

Dual band operation can be obtained with a patch antenna. The results are shown in FIG. 21. The EU resonance is at 865 MHz, but the bandwidth is only 5 MHz. The US resonance is at 910 MHz and the bandwidth is 10 MHz.

FIGS. 22 and 23 show possible process lines for PIFA inlays (smart labels).

The inlay can be manufactured, for example, in a process described in patent application PCT/FI2006/050190. This process is especially good for the PIFA type antenna, as the strap provides a good way of connecting the ground plate and the planar antenna plate together (the strap works very well as an electrical seal), and the ground and the antenna plate can be formed from any low cost metal sheet.

Next, possible process lines for inlay manufacturing will be described with reference to FIGS. 22 and 23:

A web 101 comprising straps one after the other on the surface of the web is unwound from a roll 102. Adhesive for attaching an integrated circuit on a chip to the strap is dispensed in an adhesive unit 103. The adhesive can be for example an anisotropically conductive adhesive. The chip is attached to the strap in a chip attachment unit 104. The adhesive is cured in a curing unit 105. Thus, a structural module web 107 comprising sequential structural modules is formed. The structural module web 107 is tested for the functionality of the structural modules in a testing unit 106. After the testing unit 106 there is a buffer 108 which levels out possible speed differences between the left side and the right side of the process line. After the buffer 108 there is a slitting unit 109.

A face web 112 is unwound from a roll 111. The face web 112 can be for example a paper web. The face web 112 can be printed or blank. The antenna strip, i.e. the antenna, is formed in a printing unit 113. Another alternative is to attach an electrically conductive foil strip to the face web 112. After that, hot-melt adhesive is applied selectively (only the area in which the structural module is due to be applied is covered with the adhesive) onto the surface of the face web 112 in a hot-melt adhesive unit 114.

The individual structural modules (i.e. straps) are attached to the surface of the face web 112 in a dispensing unit 110 in which the sequential structural modules are separated from each other, i.e. the structural module web 107 is cut into individual structural modules. At the same time, the structural modules are tested and the poor ones are removed. A back web 116 is unwound from a roll 115. The back web 116 can be, for example, a release liner. Hot-melt adhesive is applied onto the surface of the back web 116 in a hot-melt adhesive unit 117. Alternatively, it is possible that the hot-melt adhesive is applied to the whole area of the face web 112 in the hot-melt adhesive unit 114. In that case, the hot-melt adhesive unit 117 can be omitted. The face web 112 and the back web 116 are laminated together in a lamination nip 118 to form a smart label web 119. The smart label 119 is die-cut into individual smart labels in a die-cutting unit 120. The individual smart labels lie on the surface of the back web 116, i.e. on the surface of the release liner. A trash web 121 is wound onto a roll 122.

The ready labels on the surface of the back web 116 are separated from each other in the cross-machine direction in a slitting unit 123. The ready labels travel through a main pull unit 124 to a tester 125 which tests the functionality of the transponders. At the end of the process line there is a printing unit 126, for example an ink-jet printing unit, for printing the labels. Finally, the back web 116 having printed labels on its surface, is wound to a roll 127.

A person skilled in the art will readily realize that certain elements of the manufacturing line can be transposed. For example, the back web 116 and the face web 112 can be transposed. It is also clear that the hot-melt adhesive units can be replaced by the transfer lamination process.

The lamination of the antenna strip can also take place before the lamination of the structural module or preprinted materials can be used (a preprinted label face, a preprinted antenna strip).

Another possibility is that the label stock is purchased with the antenna strip already laminated during the manufacture of the label stock. The process may run as described above in the description of FIG. 8, but the printing unit 113 (or the antenna strip application unit) can be omitted.

It is possible that the ready web is not wound to the roll 127 but the process line continues directly so that the inlay is cut from the web and led to an injection molding process (or another suitable molding process). In the injection molding process, the core plate and the encapsulation are formed.

The strap may include a substrate, a chip and conductive leads which are connected to the chip. The leads may be capacitively connected to an antenna on the face web. Besides the above-mentioned parts it is possible that the strap includes short circuit elements.

It is possible to manufacture the tag without the strap, i.e. the chip is attached directly to the antenna.

The lamination of the antenna strip can also take place before the lamination of the structural module, or preprinted materials can be used (a preprinted label face, a preprinted antenna strip).

Another possibility is that the label stock is purchased with the antenna strip already laminated during the manufacture of the label stock. The process may run as described above in the description of FIG. 22, but the printing unit 113 (or the antenna strip application unit) can be omitted.

FIG. 23 shows another possible process line for smart labels. The process line is the same as in FIG. 22 except that the beginning of the process line is omitted. In that case the structural module web 107 has been manufactured on another process line and wound to a roll 130. The structural module web 107 is unwound from the roll 130 and led directly to the slitting unit 109.

It is possible that the ready web is not wound to the roll 127 but the process line continues directly so that the inlay is cut from the web and led to an injection molding process (or another suitable molding process). In the injection molding process the core plate and the encapsulation are formed.

The strap may include a substrate, a chip and conductive leads which are connected to the chip. The leads may be capacitively connected to an antenna on the face web. Besides the above-mentioned parts it is possible that the strap includes short circuit elements.

It is possible to manufacture the tag without the strap, i.e. the chip is directly attached to the antenna.

The manufacturing process is a combination of two main processes. The first one is the PIFA inlay manufacturing in a complete reel to reel process, as shown in FIGS. 22 and 23. The second one is the insert injection moulding where the inlay is encapsulated in plastic to provide physical protection, thereby producing the physical tag body and the mechanical clip. The key innovation in the process is to make the expensive inlay part in a reel to reel format and in this way to be able to utilize automatic insertion of inlay in injection moulding process.

The injection moulding process steps can be, for example, the following: 1) The first part of the tag body and clip is injection moulded, 2) the mould is automatically turned 180 degrees and a robot takes inlays automatically from reel and places them on top of the first part of the tag body, 3) the second part of the tag body is injection moulded (covering inlay with plastic) and in parallel, a new set of first tag bodies is moulded, 4) the robot automatically takes away ready tags from the mould (containing the first tag body, the inlay and the second tag body all joined together) and restarts from step one.

Only a few shapes of the antennas have been illustrated in this application. However, a skilled person can readily understand that also other shapes are possible as long as the shape and the size are adequate to guarantee the proper functioning of the tag.

The invention claimed is:

1. A radio frequency identification tag adapted to work at a frequency between 850 MHz and 950 MHz, comprises:
   a dielectric core plate including a face side and a back side, and an inlay comprising a dielectric substrate, a planar inverted F antenna comprising two electrically conductive plates of different size, one attached to the face side of the dielectric core plate and the other to the back side of the dielectric core plate and either one of which is capable of being used as a ground plate and the other one is capable of being used as a resonating antenna element on a surface of the substrate, the plates being electrically connected by at least one short circuit element arranged on an outer surface of the dielectric core plate, and an integrated circuit on a chip electrically connected to the electrically conductive plates, the inlay being wrapped around the core plate so that one of the electrically conductive plates is attached to the face side of the dielectric core plate, and the other electrically conductive plate is attached to the back side of the dielectric core plate.

2. The radio frequency identification tag according to claim 1, wherein the inlay is inside an encapsulation.

3. The radio frequency identification tag according to claim 1, further comprising a clip.

4. A radio frequency identification tag adapted to work at a frequency between 850 MHz and 950 MHz, characterized in that the tag comprises:
   an encapsulation including a slot having the shape of a partial loop, and an inlay comprising a substrate, two coupling plates on a surface of the substrate, and an integrated circuit on a chip electrically connected to the coupling plates, the inlay being inserted inside the slot.

5. The radio frequency identification tag according to claim 4, wherein the coupling plates are of different size.

6. The radio frequency identification tag according to claim 4, wherein the tag comprises a ground plane.

7. A radio frequency identification tag adapted to work at a frequency which is between 850 MHz and 950 MHz, the tag comprises
   a dielectric substrate including a face side and a back side, and
   on the dielectric substrate, two electrically conductive antenna patches of different size, one attached to the face side of the dielectric substrate and the other to the back side of the dielectric substrate, the patches being electrically connected by at least one short circuit element arranged on an outer surface of the dielectric substrate, an impedance matching loop, and an integrated circuit on a chip which is electrically connected to the impedance matching loop.

8. A radio frequency identification tag adapted to work at a frequency which is between 850 MHz and 950 MHz, the tag comprises
   a dielectric core plate including a face side and a back side,
   an inlay comprising a dielectric substrate, a planar inverted F antenna comprising two electrically conductive plates, one attached to the face side of the dielectric core plate and the other to the back side of the dielectric core plate and one of which functions as a resonating antenna element and the other one functions as a ground plane, the plates being electrically connected by at least one short circuit element arranged on an outer surface of the dielectric core plate, and an integrated circuit on a chip is electrically connected to the electrically conductive plates, the inlay being wrapped around the core plate so that one of the electrically conductive plates is attached to the face side of the dielectric core plate, and the other electrically conductive plate installs in use on the backside of the dielectric core plate, and
   an encapsulation which covers the dielectric core plate and the inlay.

9. The radio frequency identification tag according to claim 8, further comprising a clip.

10. The radio frequency identification tag according to claim 9, wherein the electrically conductive plate which installs in use on the backside of the dielectric core plate is inside the clip.

* * * * *